(12) United States Patent
Seo et al.

(10) Patent No.: US 9,013,380 B2
(45) Date of Patent: Apr. 21, 2015

(54) ORGANIC LIGHT EMITTING DISPLAY AND METHOD OF DRIVING THE SAME

(75) Inventors: Jeong-Min Seo, Yongin (KR); Sung-Cheon Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 343 days.

(21) Appl. No.: 13/478,054

(22) Filed: May 22, 2012

(65) Prior Publication Data

US 2013/0235016 A1 Sep. 12, 2013

(30) Foreign Application Priority Data

Mar. 6, 2012 (KR) ........................ 10-2012-0022841

(51) Int. Cl.
*G09G 3/32* (2006.01)
*H02M 3/158* (2006.01)

(52) U.S. Cl.
CPC ............ *G09G 3/3208* (2013.01); *G09G 3/3225* (2013.01); *G09G 2300/0842* (2013.01); *G09G 2330/028* (2013.01); *G09G 2330/04* (2013.01); *H02M 3/158* (2013.01)

(58) Field of Classification Search
CPC .................................. G09G 5/00; G09G 3/30
USPC ......... 345/82, 83, 204, 211–213; 341/50–107
See application file for complete search history.

(56) References Cited

U.S. PATENT DOCUMENTS

| 2001/0020928 A1* | 9/2001 | Yanagisawa et al. ........... 345/98 |
| 2005/0001825 A1 | 1/2005 | Huang |
| 2008/0174287 A1* | 7/2008 | Park .............................. 323/271 |
| 2008/0231247 A1* | 9/2008 | Uehara ......................... 323/284 |
| 2009/0058311 A1* | 3/2009 | Eom ............................. 315/173 |
| 2011/0115777 A1 | 5/2011 | Park |
| 2012/0256897 A1 | 10/2012 | Seo et al. |

FOREIGN PATENT DOCUMENTS

| KR | 10-2006-0077833 A | 7/2006 |
| KR | 10-2007-0041065 | 4/2007 |
| KR | 10-0999063 | 12/2010 |
| KR | 10-2012-0114990 | 10/2012 |

OTHER PUBLICATIONS

EPO Search Report dated Jun. 26, 2013, for corresponding European Patent application 12184913.7, (8 pages).

* cited by examiner

*Primary Examiner* — Olga Merkoulova
(74) *Attorney, Agent, or Firm* — Christie, Parker & Hale, LLP

(57) ABSTRACT

An organic light emitting display is provided. The organic light emitting display includes a display unit coupled to scan lines and data lines and including pixels configured to receive first and second power sources, and a DC-DC converter for generating the first and second power sources. The DC-DC converter includes first and second power source generating units for generating the first and second power sources from an input power source and for outputting the first and second power sources to first and second output ends, a controller for controlling driving of the first and second power source generating units, and first and second short sensing units for outputting first and second short sensing signals to the controller when voltages of the first and/or second output ends are greater than or equal to corresponding first and second reference voltages.

23 Claims, 6 Drawing Sheets

ORGANIC LIGHT EMITTING DISPLAY AND METHOD OF DRIVING THE SAME

CROSS-REFERENCE TO RELATED APPLICATION

This application claims priority to and the benefit of Korean Patent Application No. 10-2012-0022841, filed on Mar. 6, 2012 in the Korean Intellectual Property Office, the entire content of which is incorporated herein by reference.

BACKGROUND

1. Field

Aspects of embodiments of the present invention relate to an organic light emitting display and a method of driving the same.

2. Description of the Related Art

Recently, various flat panel displays (FPDs) having reduced weight and volume compared to that of cathode ray tube (CRT) devices have been developed. The FPDs include liquid crystal displays (LCDs), field emission displays (FEDs), plasma display panels (PDPs), and organic light emitting displays.

Among the FPDs, the organic light emitting displays display images using organic light emitting diodes (OLEDs) that generate light by re-combination of electrons and holes. The organic light emitting display has a high response speed and is driven with low power consumption.

In general, the organic light emitting display is divided into a passive matrix type (PMOLED) and an active matrix type (AMOLED) in accordance with a method of driving the OLEDs. The AMOLED display includes a plurality of scan lines, a plurality of data lines, a plurality of power source lines, and a plurality of pixels coupled to the wiring lines and arranged in a matrix.

A DC-DC converter for generating power sources required for driving the pixels by boosting or dropping the voltage of an external power source may be provided in the organic light emitting display. The DC-DC converter supplies the generated power sources to the pixels for displaying an image through the power source lines. Detecting short circuits in such displays is an important safety concern.

SUMMARY

Accordingly, aspects of embodiments of the present invention provide for an organic light emitting display capable of sensing whether or not short circuits exist in power source lines, and a method of driving the organic light emitting display. Further aspects provide for an organic light emitting display capable of preventing or reducing additional damage (such as to the pixels, or from fire) caused by short circuits in the power source lines, and a method of driving the organic light emitting display.

According to an exemplary embodiment of the present invention, an organic light emitting display is provided. The organic light emitting display includes: a display unit coupled to scan lines and data lines, and including pixels configured to receive a first power source and a second power source; and a DC-DC converter for generating the first power source and the second power source. The DC-DC converter includes: a first power source generating unit for generating the first power source from an input power source and for outputting the first power source to a first output end; a second power source generating unit for generating the second power source from the input power source and for outputting the second power source to a second output end; a controller for controlling driving of the first power source generating unit and the second power source generating unit; a first short sensing unit for outputting a first short sensing signal to the controller when a voltage of the first output end is greater than or equal to a first reference voltage; and a second short sensing unit for outputting a second short sensing signal to the controller when a voltage of the second output end is greater than or equal to a second reference voltage.

The first short sensing unit may be configured to operate in accordance with a first operation signal supplied from the controller. The second short sensing unit may be configured to operate in accordance with a second operation signal supplied from the controller.

The controller may be configured to transmit the first operation signal to the first short sensing unit in a first period, and to transmit the second operation signal to the second short sensing unit in a second period, the second period taking place after the first period.

The controller may be configured to not transmit the second operation signal to the second short sensing unit after the first short sensing signal is received.

The organic light emitting display may further include: a first pull down resistor and a first pull down switch serially coupled between the first output end and a ground power source; and a second pull down resistor and a second pull down switch serially coupled between the second output end and the ground power source.

The first pull down switch may be configured to turn on in the first period.

The second pull down switch may be configured to turn on in the second period.

The second pull down switch may be configured to not turn on if the first short sensing signal is transmitted to the controller before the second period.

The first power source generating unit may be configured to output a ground power source in the first period.

The second power source generating unit may be configured to output a ground power source in the second period.

The display unit may be configured to display a black image in a period spanning the first period through the second period.

The controller may be configured to stop driving the first power source generating unit and the second power source generating unit after the first short sensing signal or the second short sensing signal is received.

The first power source may be configured to have a positive polarity voltage, and the second power source may be configured to have a negative polarity voltage.

According to another exemplary embodiment of the present invention, a method of driving an organic light emitting display is provided. The method includes: detecting a voltage of a first output end of a first power source generating unit in a first period; comparing the detected voltage of the first output end with a first reference voltage to determine if the voltage of the first output end is normal; detecting a voltage of a second output end of a second power source generating unit in a second period that takes place after the first period; comparing the detected voltage of the second output end with a second reference voltage to determine if the voltage of the second output end is normal; and determining whether or not to stop driving the first power source generating unit and the second power source generating unit in accordance with whether or not the voltage of the first output end and the voltage of the second output end are normal.

The method may further include transmitting a first short sensing signal to a controller when the voltage of the first output end is greater than or equal to the first reference voltage.

The method may further include transmitting a second short sensing signal to the controller when the voltage of the second output end is greater than or equal to the second reference voltage.

The method may further include stopping the driving of the first power source generating unit and the second power source generating unit after the controller receives the first short sensing signal or the second short sensing signal.

The method may further include: coupling the first output end to a ground power source through a first pull down resistor and a first pull down switch serially coupled to each other; and coupling the second output end to a ground power source through a second pull down resistor and a second pull down switch serially coupled to each other.

The method may further include turning on the first pull down switch in the first period.

The method may further include turning on the second pull down switch in the second period.

The method may further include outputting a ground power source at the first output end in the first period.

The method may further include outputting a ground power source at the second output end in the second period.

The method may further include displaying a black image on a display unit in a period spanning from the first period through the second period when the display unit receives a first power source and a second power source from the first power source generating unit and the second power source generating unit, respectively.

The method may further include: supplying the first power source as a positive polarity voltage; and supplying the second power source as a negative polarity voltage.

As described above, according to embodiments the present invention, it is possible to provide an organic light emitting display capable of sensing whether or not short circuits exist in power source lines, and a method of driving the organic light emitting display. In addition, it is possible to provide an organic light emitting display capable of preventing additional damage (such as to the pixels, or from fire) caused by short circuits in the power lines, and a method of driving the same.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

Figure 1:
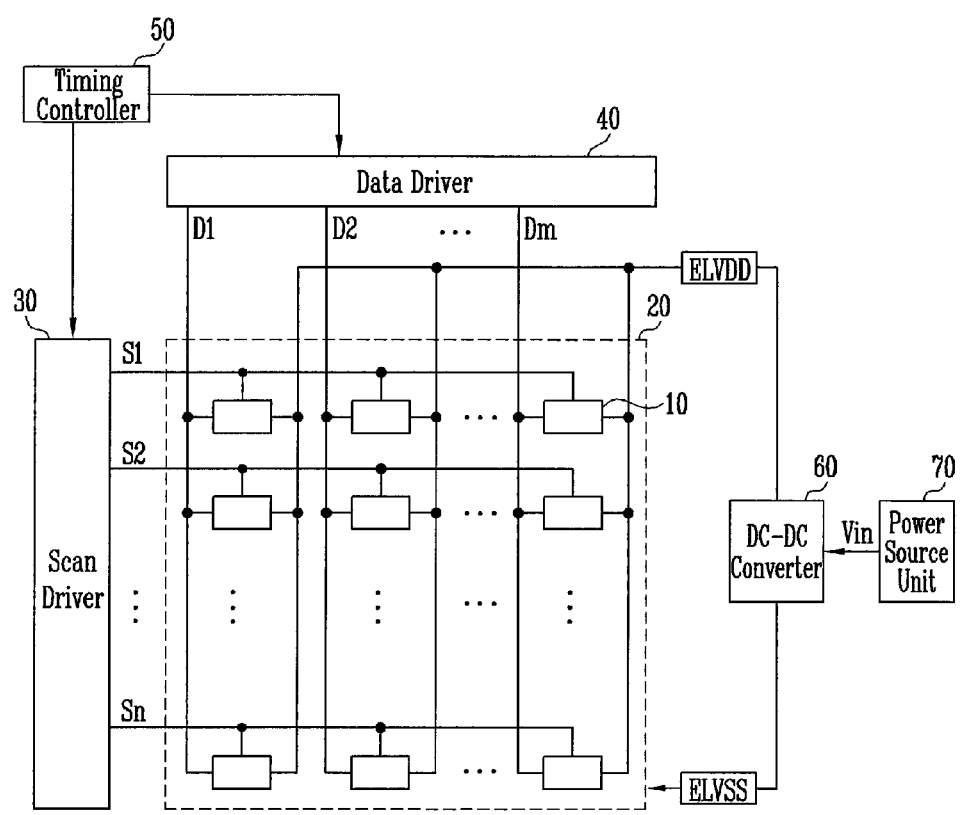
FIG. 1 is a schematic view illustrating an organic light emitting display according to an embodiment of the present invention.

Hereinafter, certain exemplary embodiments according to the present invention will be described with reference to the accompanying drawings. Here, when a first element is described as being coupled to a second element, the first element may be directly coupled (e.g., connected) to the second element or indirectly coupled (e.g., electrically connected) to the second element via one or more third elements. Further, some of the elements that are not essential to the complete understanding of the invention may be omitted for clarity. In addition, like reference numerals refer to like elements throughout, the descriptions of which may only be provided once (such as at their first appearance). The invention may, however, be embodied in many different forms and should not be construed as being limited to the embodiments set forth herein.

Embodiments of an organic light emitting display according to the present invention and a method of driving the organic light emitting display will be described with reference to the drawings. In the organic light emitting display, a DC-DC converter for generating power sources (e.g., power) for driving the pixels is provided. For example, the DC-DC converter can generate a first power source (ELVDD) by boosting the voltage of an external power source, and a second power source (ELVSS) by lowering the voltage of the external power source.

The DC-DC converter supplies the generated power sources to the pixels (for displaying an image) through power source wiring lines. However, the power source wiring lines may be short circuited with each other or with other wiring lines due to, for example, a failure during the manufacturing process, or from ordinary use. When such a short circuit takes place, and the DC-DC converter is driven, additional damage, such as pixel failure or from fire, may take place. Accordingly, embodiments of the present invention sense whether or not short circuits exist in the power source lines.

FIG. 1 is a schematic view illustrating an organic light emitting display according to an embodiment of the present invention.

Referring to FIG. 1, the organic light emitting display includes a display unit 20 including pixels 10 coupled to scan lines S1 to Sn and data lines D1 to Dm, a scan driver 30 for supplying scan signals to the pixels 10 through the scan lines S1 to Sn, a data driver 40 for supplying data signals to the pixels 10 through the data lines D1 to Dm, and a DC-DC converter 60 for supplying a first power source ELVDD and a second power source ELVSS to the pixels 10. The organic light emitting display may further include a timing controller 50 for controlling the scan driver 30 and the data driver 40.

The pixels 10 that receive the first power source ELVDD and the second power source ELVSS from the DC-DC converter 60 generate light components corresponding to the data signals. The data signals control corresponding currents that flow from the first power source ELVDD to the second power source ELVSS via organic light emitting diodes (OLEDs).

Figure 2:
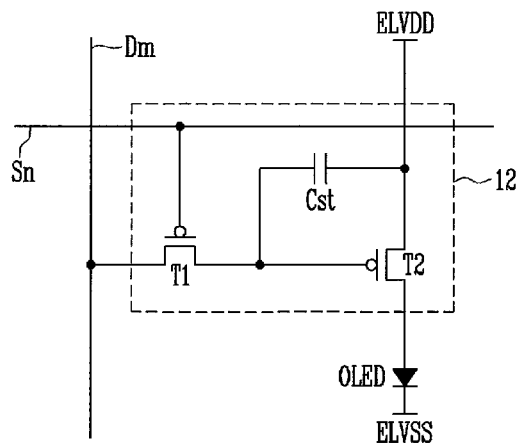
FIG. 2 is a circuit view illustrating an exemplary pixel of the organic light emitting display of FIG. 1.

The scan driver 30 generates the scan signals under the control of the timing controller 50 and supplies the generated scan signals to the scan lines S1 to Sn. The data driver 40 generates the data signals under the control of the timing controller 50 and supplies the generated data signals to the data lines D1 to Dm. When the scan signals are sequentially supplied to the scan lines S1 to Sn, the pixels 10 are sequentially selected by lines and the selected pixels 10 receive the data signals transmitted from the data lines D1 to Dm FIG. 2 is a circuit view illustrating an exemplary pixel 10 of the organic light emitting display of FIG. 1. In particular, in FIG. 2, for convenience of illustration, the pixel 10 is coupled to the nth scan line Sn and the mth data line Dm.

Referring to FIG. 2, the pixel 10 includes a pixel circuit 12 for controlling an OLED, the pixel circuit 12 being coupled to the OLED, the data line Dm, and the scan line Sn. The anode electrode of the OLED is coupled to the pixel circuit 12 and the cathode electrode of the OLED is coupled to the second power source ELVSS. The OLED generates light of a particular brightness (for example, a predetermined brightness) to correspond to the current supplied from the pixel circuit 12.

The pixel circuit 12 controls the amount of current supplied to the OLED to correspond to the data signal supplied to the data line Dm when the scan signal is supplied to the scan line Sn. To accomplish this, the pixel circuit 12 includes a second transistor T2 coupled between the first power source ELVDD and the OLED; a first transistor T1 coupled between the second transistor T2, the data line Dm, and the scan line Sn; and a storage capacitor Cst coupled between the gate electrode of the second transistor T2 and the first electrode of the second transistor T2.

The gate electrode of the first transistor T1 is coupled to the scan line Sn and the first electrode of the first transistor T1 is coupled to the data line Dm. The second electrode of the first transistor T1 is coupled to one terminal of the storage capacitor Cst. Throughout this description, the first electrode may be set to one of a source electrode or a drain electrode, while the second electrode is set to an electrode different from the first electrode. For example, when the first electrode is set to the source electrode, the second electrode is set to the drain electrode, and vice versa.

The first transistor T1 is turned on when the scan signal is supplied from the scan line Sn. The first transistor T1 then supplies the data signal supplied from the data line Dm to the storage capacitor Cst. The storage capacitor Cst then charges a voltage corresponding to the data signal.

The gate electrode of the second transistor T2 is coupled to one terminal of the storage capacitor Cst, and the first electrode of the second transistor T2 is coupled to the other terminal of the storage capacitor Cst and the first power source ELVDD. The second electrode of the second transistor T2 is coupled to the anode electrode of the OLED. The second transistor T2 controls the amount of current that flows from the first power source ELVDD to the second power source ELVSS via the OLED to correspond to the voltage value stored in the storage capacitor Cst. The OLED then generates light corresponding to the amount of current supplied from the second transistor T2.

Since the above described structure of the pixel 10 of FIG. 2 is only an embodiment of the present invention, the structure of the pixel 10 according to the present invention is not limited to the above-described structure.

Referring back to FIG. 1, the DC-DC converter 60 receives an input power source Vin from a power source unit 70 and converts the input power source Vin to generate the first power source ELVDD and the second power source ELVSS supplied to the pixels 10. For example, the first power source ELVDD may be set to a positive polarity voltage and the second power source ELVSS may be set to a negative polarity voltage.

The power source unit 70 may be, for example, a battery for providing a DC power source or a rectifying apparatus for converting an alternating current (AC) power source into a DC power source and outputting the DC power source. However, the power source unit 70 is not limited to the above.

Figure 3:
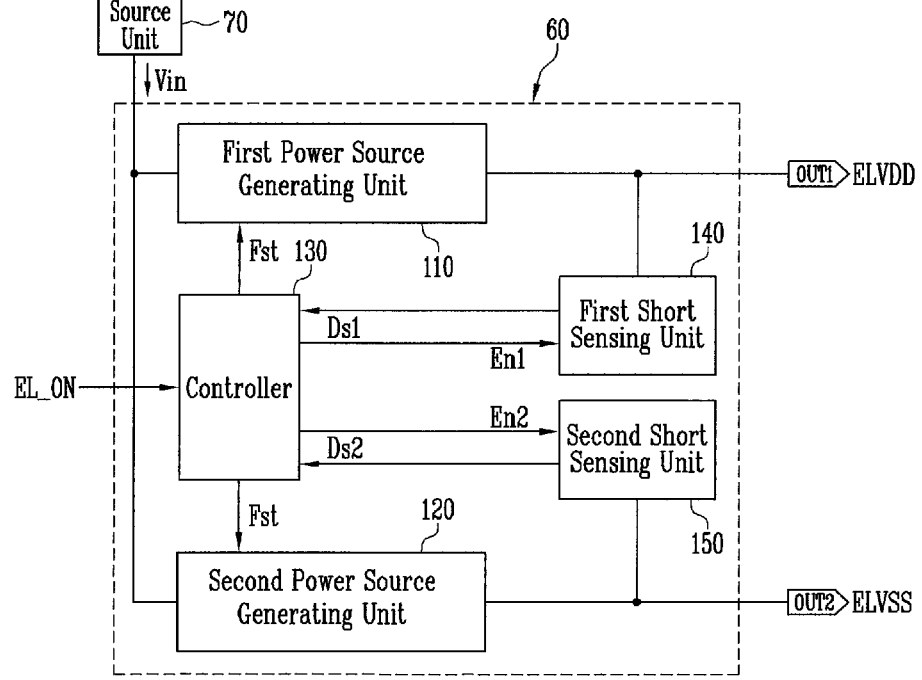
FIG. 3 is a block diagram illustrating an exemplary DC-DC converter of the organic light emitting display of FIG. 1.
Figure 4:
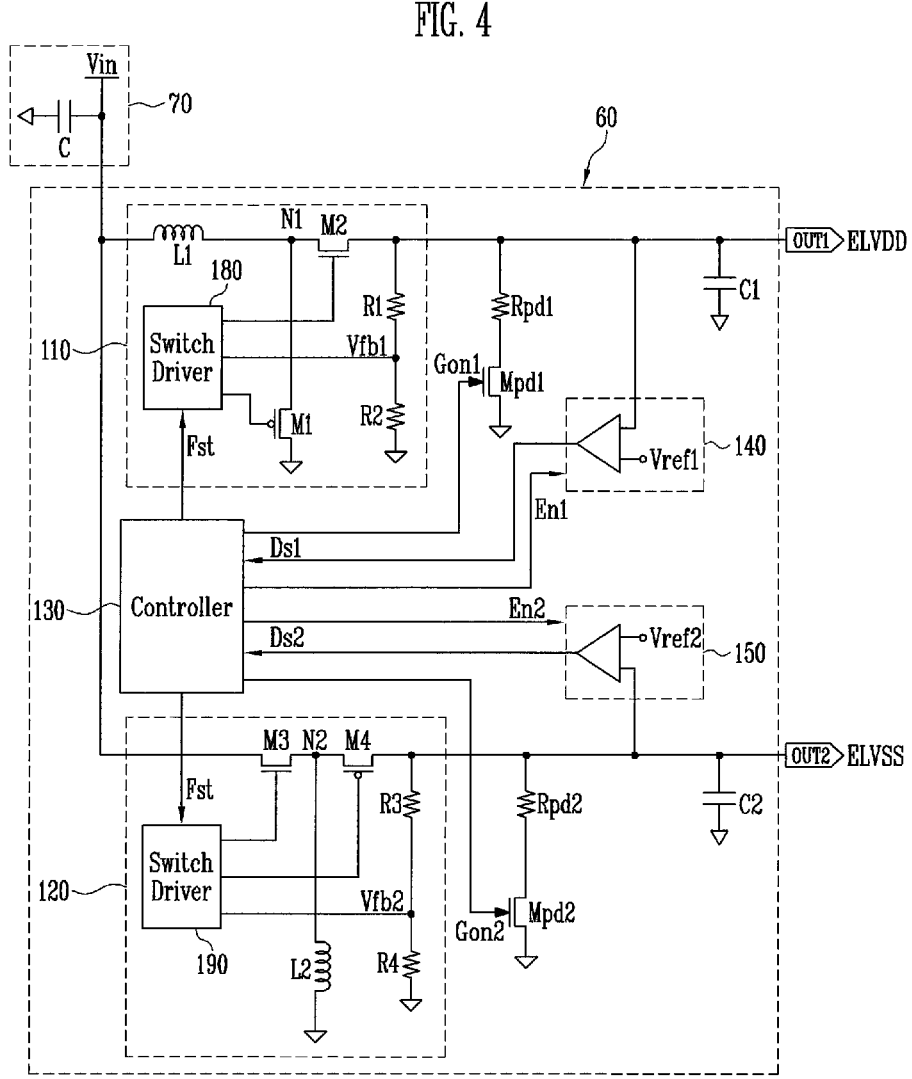
FIG. 4 is a schematic view illustrating an exemplary circuit structure of the DC-DC converter of FIG. 3.

FIG. 3 is a block diagram illustrating an exemplary DC-DC converter of the organic light emitting display of FIG. 1. FIG. 4 is a schematic view illustrating an exemplary circuit structure of the DC-DC converter of FIG. 3.

Referring to FIGS. 3 and 4, the DC-DC converter 60 includes a first power source generating unit 110, a second power source generating unit 120, a controller 130, a first short sensing unit 140, and a second short sensing unit 150.

The first power source generating unit 110 receives an input power source Vin to generate the first power source ELVDD, and outputs the first power source ELVDD to a first output end OUT1. For example, the first power source generating unit 110 may boost the voltage of the input power source Vin using internal elements to generate the first power source ELVDD.

In a similar fashion, the second power source generating unit 120 receives the input power source Vin to generate the second power source ELVSS, and outputs the second power source ELVSS to a second output end OUT2. For example, the second power source generating unit 120 may lower the voltage of the input power source Vin using internal elements to generate the second power source ELVSS. The first power source ELVDD and the second power source ELVSS output to the first output end OUT1 and the second output end OUT2, respectively, are supplied to the pixels 10 included in the display unit 20.

The controller 130 controls the driving of the first power source generating unit 110 and the second power source generating unit 120. When a short circuit is sensed by the first short sensing unit 140 or the second short sensing unit 150, the controller 130 supplies a driving stop signal Fst to the first power source generating unit 110 and/or the second power source generating unit 120 to stop the driving of the first power source generating unit 110 and/or the second power source generating unit 120. In addition, the operation of the controller 130 may be controlled by an actuation signal EL_ON supplied from the timing controller 50.

The first short sensing unit 140 detects the voltage of the first output end OUT1 and compares it with a first reference voltage Vref1 (see FIG. 4). When the voltage of the first output end OUT1 is greater than or equal to (or not less than) the first reference voltage Vref1, the first short sensing unit 140 outputs a first short sensing signal Ds1 to the controller 130. The first short sensing unit 140 may operate, for example, to correspond to a first operation signal En1 supplied from the controller 130.

In a similar fashion, the second short sensing unit 150 detects the voltage of the second output end OUT2 and compares it with a second reference voltage Vref2 (see FIG. 4). When the voltage of the second output end OUT2 is greater than or equal to the second reference voltage Vref2, the second short sensing unit 150 outputs a second short sensing signal Ds2 to the controller 130. The second short sensing unit 150 may operate, for example, to correspond to a second operation signal Ent supplied from the controller 130.

When the first short sensing signal Ds1 is received from the first short sensing unit 140 or the second short sensing signal Ds2 is received from the second short sensing unit 150, the controller 130 supplies the driving stop signal Fst to the first power source generating unit 110 and the second power source generating unit 120 to stop the driving of the first power source generating unit 110 and the second power source generating unit 120. Therefore, when a short circuit in a power source line is sensed, the driving of the first power source generating unit 110 and the second power source generating unit 120 is stopped to reduce or prevent additional damage, such as pixel damage or damage from fire.

In further detail, and with particular reference to FIG. 4, the DC-DC converter may further include a first pull down resistor Rpd1, a first pull down switch Mpd1, a second pull down resistor Rpd2, and a second pull down switch Mpd2. The first pull down resistor Rpd1 and the first pull down switch Mpd1 are serially coupled between the first output end OUT1 and a ground power source. The second pull down resistor Rpd2 and the second pull down switch Mpd2 are serially coupled between the second output end OUT2 and the ground power source.

The first pull down switch Mpd1 and the second pull down switch Mpd2 are turned on and off by the controller 130, and may be realized as transistors as illustrated in FIG. 4. In particular, the first pull down switch Mpd1 may be turned on to correspond to (for example, in response to) a first driving signal Gon1 supplied from the controller 130. In a similar fashion, the second pull down switch Mpd2 may be turned on to correspond to (for example, in response to) a second driving signal Gon2 supplied from the controller 130.

Referring to FIG. 4, the structures of the first power source generating unit 110 and the second power source generating unit 120 will be described in further detail. The first power source generating unit 110 includes a first inductor L1 coupled between the power source unit 70 and a first node N1, a first transistor M1 coupled between the first node N1 and the ground power source, a second transistor M2 coupled between the first node N1 and the first output end OUT1, and a first switch driver 180 for controlling the turning on and off of the first transistor M1 and the second transistor M2.

The first switch driver 180 may receive a first feedback voltage Vfb1 from resistors R1 and R2 serially coupled between the first output end OUT1 and the ground power source. The first switch driver 180 may stop the driving of the first power source generating unit 110 when the driving stop signal Fst is transmitted from the controller 130. For example, when the driving stoop signal Fst is transmitted from the controller 130, the first switch driver 180 maintains the first transistor M1 and the second transistor M2 in a turn off state to stop the driving of the first power source generating unit 110. A first capacitor C1 may be further coupled to the first output end OUT1 from which the first power source ELVDD is output, as shown in FIG. 4.

In a similar fashion, the second power source generating unit 120 includes a third transistor M3 coupled between the power source unit 70 and a second node N2, a fourth transistor M4 coupled between the second node N2 and the second output end OUT2, a second inductor L2 coupled between the second node N2 and the ground power source, and a second switch driver 190 for controlling the turning on and off of the third transistor M3 and the fourth transistor M4.

The second switch driver 190 may receive a second feedback voltage Vfb2 from resistors R3 and R4 serially coupled between the second output end OUT2 and the ground power source. The second switch driver 190 may stop the driving of the second power source generating unit 120 when the driving stop signal Fst is transmitted from the controller 130. For example, when the driving stop signal Fst is transmitted from the controller 130, the second switch driver 190 maintains the third transistor M3 and the fourth transistor M4 in the turn off state to stop the driving of the second power source generating unit 120. A second capacitor C2 may be further coupled to the second output end OUT2 from which the second power source ELVSS is output, as shown in FIG. 4.

The above-described structures of the first power source generating unit 110 and the second power source generating unit 120 are only an embodiment of the present invention. The present invention is not limited to the above. For example, the first power source generating unit 110 may be realized by a previously published boost type converter and the second power source generating unit 120 may be realized by a previously published drop type converter.

Figure 5:
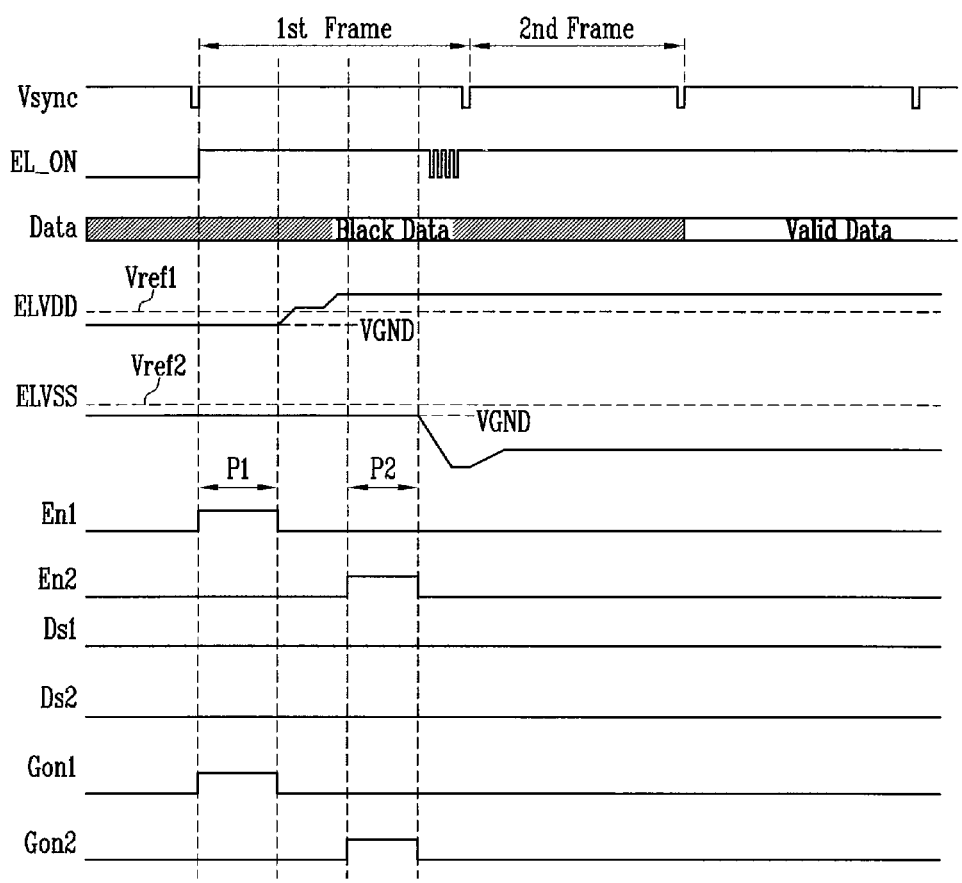
FIG. 5 is a waveform chart illustrating a method of driving an organic light emitting display when there is no short circuit in power source supply wiring lines.

FIG. 5 is a waveform chart illustrating a method of driving an organic light emitting display when there is no short circuit in power source supply wiring lines. In particular, FIG. 5 illustrates the case in which there is no short circuit in the supply wiring line of the first power source ELVDD and the supply wiring line of the second power source ELVSS.

Referring to FIG. 5, when the actuation signal EL_ON is supplied to the controller 130 of the DC-DC converter 60 together with the supply of a vertical synchronizing signal Vsync that distinguishes a frame, the actuation of the DC-DC converter 60 starts. In order to prevent or lessen the likelihood of a change in the voltages of the first power source ELVDD and the second power source ELVSS from affecting an image displayed on the display unit 20, in initial frames (for example, a first frame and a second frame), a black image is displayed. Therefore, the data driver may supply black data to the pixels 10 included in the display unit 20 in the initial frame periods. In addition, the first period P1 in which the first short sensing unit 140 operates and the second period P2 in which the second short sensing unit 150 operates are performed while the display unit 20 displays the black image.

The first power source generating unit 110 may boost the voltage of the first power source ELVDD output to the first output end OUT1 from the ground voltage VGND to a target voltage (for example, a predetermined target voltage) having positive polarity in accordance with the control of the controller 130. In addition, the first power source generating unit 110 may maintain the voltage of the first power source ELVDD as the ground voltage VGND in the first period P1 when the first short sensing unit 140 operates. Next, the first power source generating unit 110 may sequentially raise (for example, in steps) the voltage of the first power source ELVDD from the ground voltage VGND to the target voltage in a period between the first period P1 and the second period P2. This allows the first power source generating unit 110 to uniformly output the first power source ELVDD at the target voltage during the second period P2 when the second short sensing unit 150 operates.

In a similar fashion, the second power source generating unit 120 may lower the voltage of the second power source ELVSS output to the second output end OUT2 from the ground voltage VGND to a target voltage (for example, a predetermined target voltage) having negative polarity in accordance with the control of the controller 130. In addition, the second power source generating unit 120 may maintain the voltage of the second power source ELVSS as the ground voltage VGND in the second period P2 when the second short sensing unit 150 operates. Next, the second power source generating unit 120 may lower the voltage of the second power source ELVSS to the target voltage when a short circuit is not sensed by the second short sensing unit 150.

In further detail and with reference to FIG. 5, in the first period P1, when the first operation signal En1 is supplied from the controller 130, the first short sensing unit 140 detects the voltage of the first output end OUT1 of the first power source generating unit 110 to compare the detected voltage with the first reference voltage Vref1. If the voltage of the first output end OUT1 is greater than or equal to the first reference voltage Vref1, the first short sensing unit 140 transmits the first short sensing signal Ds1 to the controller 130.

If, however, as in FIG. 5, the voltage of the first output end OUT1 maintains the ground voltage VGND in the first period P1 so that the voltage of the first output end OUT1 is lower than the first reference voltage Vref1, the first short sensing unit 140 determines that there is no short circuit in the supply wiring line of the first power source ELVDD, and outputs a normal signal to the controller 130. The controller 130 (that receives a normal signal from the first short sensing unit 140) then controls the first power source generating unit 110 to boost the voltage of the first power source ELVDD output to the first output end OUT1 to the target voltage.

In the first period P1 when the first short sensing unit 140 operates, in order to stabilize the voltage of the first output end OUT1 to the ground voltage GND, the first pull down switch Mpd1 may be turned on in the first period P1. Therefore, the controller 130 supplies the first driving signal Gon1 to the first pull down switch Mpd1 in the first period P1 to maintain the turn on state of the first pull down switch Mpd1 in the first period P1. Accordingly, the correctness of the determination of a short circuit performed by the first short sensing unit 140 may increase.

Next, since in FIG. 5, the first short sensing signal Ds1 is not generated by the first short sensing unit 140, the second short sensing unit 150 operates in the second period P2. That is, when the second operation signal En2 is supplied from the controller 130, the second short sensing unit 150 detects the voltage of the second output end OUT2 of the second power source generating unit 120 to compare the detected voltage with the second reference voltage Vref2. If the voltage of the second output end OUT2 is greater than or equal to the second reference voltage Vref2, the second short sensing unit 150 transmits the second short sensing signal Ds2 to the controller 130.

If, however, as in FIG. 5, the voltage of the second output end OUT2 maintains the ground voltage VGND in the second period P2 so that the voltage of the second output end OUT2 is lower than the second reference voltage Vref2, the second short sensing unit 150 determines that there is no short circuit in the supply wiring line of the second power source ELVSS, and outputs a normal signal to the controller 130. The controller 130 (that receives the normal signal from the second short sensing unit 150) then controls the second power source generating unit 120 to lower the voltage of the second power source ELVSS output to the second output end OUT2 to the target voltage.

In order to stabilize the voltage of the second output end OUT2 to the ground voltage VGND in the second period P2 when the second short sensing unit 150 operates, the second pull down switch Mpd2 may be turned on in the second period P2. Therefore, the controller 130 supplies the second driving signal Gon2 to the second pull down switch Mpd2 in the second period P2 to maintain the turn on state of the second pull down switch Mpd2 in the second period P2. Accordingly, the correctness of the determination of a short circuit performed by the second short sensing unit 150 may increase.

Through the first period P1 and the second period P2 that sequentially proceed, it is determined in the first period P1 whether or not a short circuit exists between the supply wiring line of the first power source ELVDD and other wiring lines (for example, scan lines and data lines). In addition, it is determined in the second period P2 whether or not a short circuit exists between the supply wiring line of the second power source ELVSS and the supply wiring line of the first power source ELVDD, and whether or not a short circuit exists between the supply wiring line of the second power source ELVSS and the other wiring lines (for example, the scan lines and the data lines).

Figure 6:
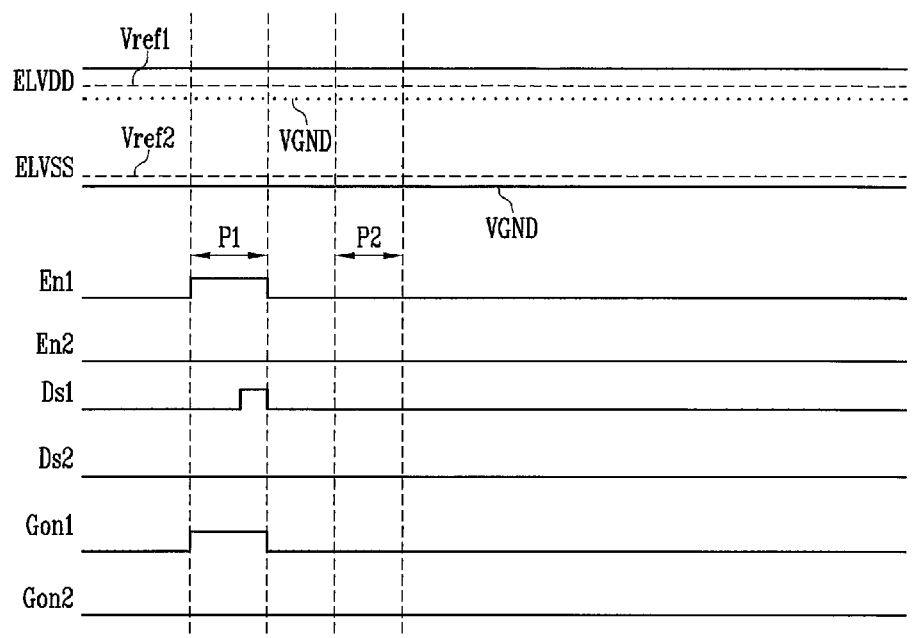
FIG. 6 is a waveform chart illustrating a method of driving an organic light emitting display when wiring lines for supplying a first power source are short circuited with other wiring lines.

FIG. 6 is a waveform chart illustrating a method of driving an organic light emitting display when wiring lines for supplying the first power source are short circuited with other wiring lines.

Since FIG. 6 illustrates the case in which the supply wiring line of the first power source ELVDD is short circuited with the other wiring lines, the voltage of the first output end OUT1 is the same as or similar to the voltages of the other wiring lines. Accordingly, the first short sensing unit 140 that operates in the first period P1 determines that there is a short circuit in the supply wiring line of the first power source ELVDD since the voltage of the first output end OUT1 is higher than the first reference voltage Vref1. The first short sensing unit 140 then supplies the first short sensing signal Ds1 to the controller 130.

The controller 130 then supplies the driving stop signal Fst to the first power source generating unit 110 and the second power source generating unit 120 to correspond to the first short sensing signal Ds1. Therefore, the first power source generating unit 110 and the second power source generating unit 120 stop driving.

When the determination that a short circuit exists is made by the first short sensing unit 140, the second short sensing unit 150 does not need to operate. Therefore, when the controller 130 receives the first short sensing signal Ds1 from the first short sensing unit 140, the controller 130 does not transmit the second operation signal En2 to the second short sensing unit 150 so that the second short sensing unit 150 does not operate.

In addition, since the second short sensing unit 150 does not operate, the second pull down switch Mpd2 does not need to be turned on. Therefore, when the controller 130 receives the first short sensing signal Ds1 from the first short sensing unit 140, the controller 130 does not transmit the second driving signal Gon2 to the second pull down switch Mpd2 so that the turn off state of the second pull down switch Mpd2 may be maintained. As a result, when it is determined by the first short sensing unit 140 that the supply wiring line of the first power source ELVDD is short circuited, the second short sensing unit 150 does not operate and the second pull down switch Mpd2 is not turned on in the second period P2.

Figure 7:
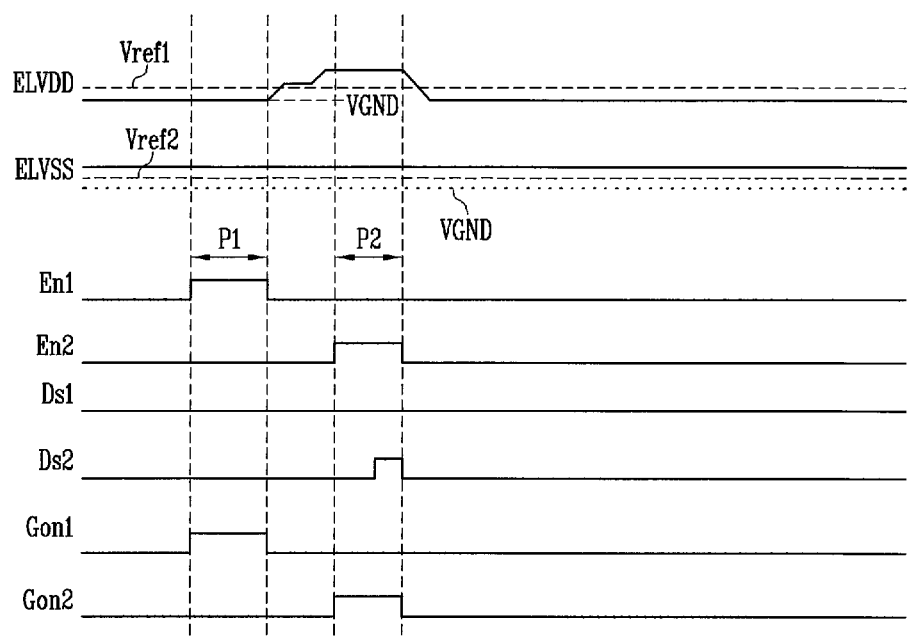
FIG. 7 is a waveform chart illustrating a method of driving an organic light emitting display when wiring lines for supplying a second power source are short-circuited with the wiring lines for supplying the first power source or with the other wiring lines.

FIG. 7 is a waveform chart illustrating a method of driving an organic light emitting display when wiring lines for supplying the second power source are short circuited with the wiring lines for supplying the first power source or with the other wiring lines.

First, the voltage of the first output end OUT1 maintains the ground voltage VGND in the first period P1, so the first short sensing unit 140 determines that the voltage of the first output end OUT1 is lower than the first reference voltage Vref1 and thus, there is no short circuit in the supply wiring line of the first power source ELVDD. As described above, the first pull down switch Mpd1 may maintain the turn on state in the first period P1. Since the first short sensing unit 140 does not sense a short circuit of the supply wiring line of the first power source ELVDD, the normal signal is output to the controller 130. The controller 130 may then operate the second short sensing unit 150 in the second period P2 to correspond to the normal signal supplied from the first short sensing unit 140.

Since FIG. 7 illustrates the case in which the supply wiring line of the second power source ELVSS is short circuited with the supply wiring line of the first power source ELVDD or the other wiring lines, the voltage of the second output end OUT2 is the same as or similar to the voltage of the supply wiring line of the first power source ELVDD or the voltages of the different wiring lines. Accordingly, the second short sensing unit 150 that operates in the second period P2 determines that there is a short circuit in the supply wiring line of the second power source ELVSS since the voltage of the second output end OUT2 is higher than the second reference voltage Vref2. The second short sensing unit 150 then supplies the second short sensing signal Ds2 to the controller 130.

The controller 130 then supplies the driving stop signal Fst to the first power source generating unit 110 and the second power source generating unit 120 to correspond to the second short sensing signal Ds2. Therefore, the first power source generating unit 110 and the second power source generating unit 120 stop driving. At this point, the voltage of the first power source ELVDD output by the first power source generating unit 110 is lowered to the ground voltage VGND.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display comprising:
    a display unit coupled to scan lines and data lines, and including pixels configured to receive a first power source and a second power source; and
    a DC-DC converter generating the first power source and the second power source, the DC-DC converter comprising:
        a first power source generating unit generating the first power source from an input power source and outputting the first power source to a first output end;
        a second power source generating unit generating the second power source from the input power source and outputting the second power source to a second output end;
        a controller controlling driving of the first power source generating unit and the second power source generating unit;
        a first short sensing unit receiving a first operation signal from the controller, receiving a voltage of the first output end, and outputting a first short sensing signal to the controller in accordance with the first operation signal when the voltage of the first output end is greater than or equal to a first reference voltage; and
        a second short sensing unit receiving a second operation signal from the controller, receiving a voltage of the second output end, and outputting a second short sensing signal to the controller in accordance with the first operation signal when the voltage of the second output end is greater than or equal to a second reference voltage.

2. The organic light emitting display as claimed in claim 1, wherein the controller is configured to transmit the first operation signal to the first short sensing unit in a first period, and to transmit the second operation signal to the second short sensing unit in a second period, the second period taking place after the first period.

3. The organic light emitting display as claimed in claim 2, wherein the controller is configured to not transmit the second operation signal to the second short sensing unit after the first short sensing signal is received.

4. The organic light emitting display as claimed in claim 2, further comprising:
    a first pull down resistor and a first pull down switch serially coupled between the first output end and a ground power source; and
    a second pull down resistor and a second pull down switch serially coupled between the second output end and the ground power source.

5. The organic light emitting display as claimed in claim 4, wherein the first pull down switch is configured to turn on in the first period.

6. The organic light emitting display as claimed in claim 5, wherein the second pull down switch is configured to turn on in the second period.

7. The organic light emitting display as claimed in claim 6, wherein the second pull down switch is configured to not turn on if the first short sensing signal is transmitted to the controller before the second period.

8. The organic light emitting display as claimed in claim 2, wherein the first power source generating unit is configured to output a ground power source in the first period.

9. The organic light emitting display as claimed in claim 2, wherein the second power source generating unit is configured to output a ground power source in the second period.

10. The organic light emitting display as claimed in claim 2, wherein the display unit is configured to display a black image in a period spanning the first period through the second period.

11. The organic light emitting display as claimed in claim 1, wherein the controller is configured to stop driving the first power source generating unit and the second power source generating unit after the first short sensing signal or the second short sensing signal is received.

12. The organic light emitting display as claimed in claim 1,
    wherein the first power source is configured to have a positive polarity voltage, and
    wherein the second power source is configured to have a negative polarity voltage.

13. A method of driving an organic light emitting display, comprising:
    detecting, in accordance with a first operation signal received from a controller, a voltage of a first output end of a first power source generating unit in a first period;
    comparing the detected voltage of the first output end with a first reference voltage to determine if the voltage of the first output end is normal;
    detecting, in accordance with a second operation signal received from the controller, a voltage of a second output end of a second power source generating unit in a second period that takes place after the first period;
    comparing the detected voltage of the second output end with a second reference voltage to determine if the voltage of the second output end is normal; and
    determining whether or not to stop driving the first power source generating unit and the second power source generating unit in accordance with whether or not the voltage of the first output end and the voltage of the second output end are normal.

14. The method as claimed in claim 13, further comprising transmitting a first short sensing signal to the controller when the voltage of the first output end is greater than or equal to the first reference voltage.

15. The method as claimed in claim 14, further comprising transmitting a second short sensing signal to the controller when the voltage of the second output end is greater than or equal to the second reference voltage.

16. The method as claimed in claim 15, further comprising stopping the driving of the first power source generating unit and the second power source generating unit after the controller receives the first short sensing signal or the second short sensing signal.

17. The method as claimed in claim 13, further comprising:
coupling the first output end to a ground power source through a first pull down resistor and a first pull down switch serially coupled to each other; and
coupling the second output end to a ground power source through a second pull down resistor and a second pull down switch serially coupled to each other.

18. The method as claimed in claim 17, further comprising turning on the first pull down switch in the first period.

19. The method as claimed in claim 18, further comprising turning on the second pull down switch in the second period.

20. The method as claimed in claim 13, further comprising outputting a ground power source at the first output end in the first period.

21. The method as claimed in claim 13, further comprising outputting a ground power source at the second output end in the second period.

22. The method as claimed in claim 13, further comprising displaying a black image on a display unit in a period spanning from the first period through the second period when the display unit receives a first power source and a second power source from the first power source generating unit and the second power source generating unit, respectively.

23. The method as claimed in claim 22, further comprising:
supplying the first power source as a positive polarity voltage; and
supplying the second power source as a negative polarity voltage.

* * * * *